(12) United States Patent
Tomita

(10) Patent No.: US 12,422,598 B2
(45) Date of Patent: Sep. 23, 2025

(54) ATR PRISM AND METHOD OF MANUFACTURING ATR PRISM

(71) Applicant: Nippon Electric Glass Co., Ltd., Shiga (JP)

(72) Inventor: Mitsuru Tomita, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 170 days.

(21) Appl. No.: 17/900,234

(22) Filed: Aug. 31, 2022

(65) Prior Publication Data

US 2023/0079647 A1    Mar. 16, 2023

(30) Foreign Application Priority Data

Sep. 13, 2021    (JP) ................. 2021-148793

(51) Int. Cl.
  *G02B 5/04*    (2006.01)
  *G01N 21/552*    (2014.01)

(52) U.S. Cl.
  CPC ............. *G02B 5/04* (2013.01); *G01N 21/552* (2013.01)

(58) Field of Classification Search
  CPC ........ G02B 5/04; G02B 17/004; G02B 17/04; G02B 1/02; G01N 21/552; G01N 21/35; C03C 3/321
  USPC ........ 356/445–448, 124, 370; 359/831, 834; 250/339.07, 338.1, 339.11
  See application file for complete search history.

(56) References Cited

U.S. PATENT DOCUMENTS

| | | | | |
|---|---|---|---|---|
| 4,818,710 A | * | 4/1989 | Sutherland | G01N 21/648 436/805 |
| 2004/0121358 A1 | | 6/2004 | Uchida et al. | |
| 2010/0123900 A1 | * | 5/2010 | Chau | G01N 21/554 977/810 |
| 2016/0299063 A1 | * | 10/2016 | Ebisawa | G01N 21/359 |
| 2019/0234931 A1 | * | 8/2019 | Schonbrun | G01N 21/0303 |
| 2019/0369015 A1 | * | 12/2019 | Ismail | G01N 33/48735 |
| 2020/0060620 A1 | | 2/2020 | Ogawa et al. | |
| 2020/0158637 A1 | | 5/2020 | Fujimaki et al. | |
| 2022/0404275 A1 | | 12/2022 | Hayashi et al. | |
| 2023/0078226 A1 | * | 3/2023 | Tomita | G02B 17/04 359/834 |

FOREIGN PATENT DOCUMENTS

| | | | | |
|---|---|---|---|---|
| GB | 2148024 A | * | 5/1985 | |
| GB | 2379186 A | * | 3/2003 | |
| JP | 60-98403 | | 6/1985 | |
| JP | 2001066248 A | * | 3/2001 | |
| JP | 2010048638 A | * | 3/2010 | |

(Continued)

OTHER PUBLICATIONS

Notice of Reasons for Refusal issued Oct. 24, 2024 in corresponding Japanese Patent Application No. 2021-148793, with English-language Translation.

(Continued)

*Primary Examiner* — Tarifur R Chowdhury
(74) *Attorney, Agent, or Firm* — Wenderoth, Lind & Ponack, L.L.P.

(57) ABSTRACT

Provided is an ATR prism, including glass having an internal transmittance of 90% or higher at a wavelength falling within a wavelength range of from 8 μm to 10 μm when the glass has a thickness of 2 mm.

12 Claims, 5 Drawing Sheets

(56) References Cited

FOREIGN PATENT DOCUMENTS

| | | | |
|---|---|---|---|
| JP | 2020-163188 | | 10/2020 |
| JP | 2021-74068 | | 5/2021 |
| WO | WO 98/01401 | * | 1/1998 |
| WO | 03/056306 | | 7/2003 |
| WO | WO 2015156777 A | * | 10/2015 |
| WO | WO 2015/167417 A1 | * | 11/2015 |
| WO | 2018/190358 | | 10/2018 |
| WO | 2021/131126 | | 7/2021 |

OTHER PUBLICATIONS

Notice of Reasons for Refusal issued May 1, 2025 in corresponding Japanese Patent Application No. 2021-148793, with English-language translation.

* cited by examiner

ATR PRISM AND METHOD OF MANUFACTURING ATR PRISM

BACKGROUND OF THE INVENTION

1. Field of the Invention

The present invention relates to an ATR prism and a method of manufacturing an ATR prism.

2. Description of the Related Art

An attenuated total reflection (ATR) method is known as a method of non-invasively obtaining biological information such as a blood-sugar level. The ATR method provides an absorption spectrum of a target object by using an evanescent wave. The evanescent wave penetrates into the target object through a totally reflecting surface of an ATR prism arranged in contact with the target object when total reflection occurs in the ATR prism.

For example, an ATR prism disclosed in Japanese Patent Application Laid-open No. 2021-74068 has an incident surface, a first totally reflecting surface, a second totally reflecting surface, and an exit surface. The ATR prism causes probe light incident on the incident surface to be repeatedly totally reflected by the first totally reflecting surface and the second totally reflecting surface under a state in which the first totally reflecting surface is held in contact with a living organism. After that, the probe light exits the ATR prism through the exit surface, and is converted into a detection signal by a light detector (see paragraphs [0039] to [0041] of Japanese Patent Application Laid-open No. 2021-74068).

The ATR prism is made of, for example, a crystal material such as zinc sulfide (ZnS), zinc selenide (ZnSe), germanium, or silicon (see, for example, paragraph [0050] of Japanese Patent Application Laid-open No. 2021-74068 and page 9 of WO 2003/056306).

A related-art ATR prism is made of crystal, and the formation of the incident surface, the totally reflecting surfaces, and the exit surface requires polishing or an etching treatment. Accordingly, the formation of the ATR prism needs time and effort. In addition, low light detection accuracy due to low shape accuracy of the incident surface, the totally reflecting surfaces, and the exit surface of the ATR prism has been required to be improved. In this case, the term "shape accuracy" refers to surface roughness and angular accuracy of the incident surface, the totally reflecting surfaces, and the exit surface of the ATR prism and shape reproducibility of the surfaces of the ATR prism at the time of production of the ATR prism. The term "light detection accuracy" refers to a signal-to-noise ratio (SN ratio) of a light component extracted from the exit surface of the ATR prism.

SUMMARY OF THE INVENTION

The present invention has been made in view of the above-mentioned circumstances, and has an object to provide an ATR prism, which is produced at a high yield and comprises an incident surface, totally reflecting surfaces, and an exit surface with high shape accuracy.

In order to solve the above-mentioned problems, according to the present invention, there is provided an ATR prism, comprising glass having an internal transmittance of 90% or higher at a wavelength falling within a wavelength range of from 8 µm to 10 µm when the glass has a thickness of 2 mm. When the ATR prism is made of glass, the ATR prism can easily be formed by molding without a polishing step or an etching treatment, which has been required in the related art. As a result, a yield of the ATR prism is improved. Further, the ATR prism formed by molding comprises an incident surface, totally reflecting surfaces, and an exit surface with high shape accuracy, thus providing improved light detection accuracy.

The glass forming the ATR prism may be chalcogenide glass. The chalcogenide glass may contain sulfur at a mole percent falling within a range of from 50% to 80%, antimony at a mole percent larger than 01 and equal to or smaller than 40%, germanium at a mole percent larger than 0% and equal to or smaller than 18%, tin at a mole percent falling within a range of from 0% to 20%, and bismuth at a mole percent falling within a range of from 0% to 20%. Alternatively, the chalcogenide glass may contain tellurium at a mole percent falling within a range of from 4% to 80%, germanium at a mole percent larger than 0% and equal to or smaller than 50%, and gallium at a mole percent falling within a range of from 0% to 20%.

The ATR prism according to the present invention may further comprise an incident portion on which light having a wavelength falling within the wavelength range is incident, an exit portion configured to allow the light to exit, and a lens portion formed integrally with at least one of the incident portion and the exit portion.

When an angle of light introduced into the ATR prism having the above-mentioned configuration is adjusted by the lens portion, a signal-to-noise (SN) ratio in detection of the light extracted from the ATR prism is improved. As a result, biological information can be measured with high accuracy.

The ATR prism according to the present invention may further comprise a reflecting portion configured to reflect the light, the incident portion may comprise an inclined surface inclined with respect to the reflecting portion, and the lens portion may be formed on the inclined surface of the incident portion.

Further, the ATR prism according to the present invention may further comprise a reflecting portion configured to reflect the light, the exit portion may comprise an inclined surface inclined with respect to the reflecting portion, and the lens portion may be formed on the inclined surface of the exit portion.

In addition, the ATR prism according to the present invention may further comprise a reflecting portion configured to reflect the light, and the incident portion may be formed integrally with the reflecting portion.

Furthermore, the ATR prism according to the present invention may further comprise a reflecting portion configured to reflect the light, and the exit portion may be formed integrally with the reflecting portion.

The reflecting portion may comprise a reflecting surface configured to reflect the light. The reflecting surface may comprise a recessed portion, and the lens portion may be formed on the recessed portion so as to prevent the lens portion from projecting beyond the reflecting surface.

The incident portion may comprise the lens portion, and the recessed portion may comprise a positioning portion configured to allow positioning of a light source configured to radiate the light to the incident portion. The above-mentioned configuration enables efficient work for mounting the light source to the ATR prism.

The exit portion may comprise the lens portion, and the recessed portion may comprise a positioning portion configured to allow positioning of a light-receiving part configured to receive the light from the exit portion. The above-mentioned configuration enables efficient work for mounting the light-receiving part to the ATR prism.

In order to solve the above-mentioned problems, according to the present invention, there is provided a method of manufacturing the ATR prism, the method comprising a molding step of forming the ATR prism by pressing base-material glass with molding dies while heating the base-material glass.

The above-mentioned method comprising the molding step enables easy molding of the base-material glass into the ATR prism. The method eliminates a polishing step and an etching treatment step, which have been required in related-art methods, thus improving the yield of the ATR prism. Further, the shape accuracy of the incident surface, the totally reflecting surfaces, and the exit surface of the ATR prism is enhanced. As a result, the light detection accuracy is improved.

According to the present invention, the ATR prism, which is produced at a high yield and comprises the incident surface, the totally reflecting surfaces, and the exit surface with high shape accuracy.

DESCRIPTION OF THE EMBODIMENTS

Embodiments of the present invention are now described with reference to the accompanying drawings. FIG. 1 to FIG. 4 are views for illustrating a measurement device comprising an ATR prism according to a first embodiment, the ATR prism, and a method of manufacturing an ATR prism, respectively.

Figure 1:
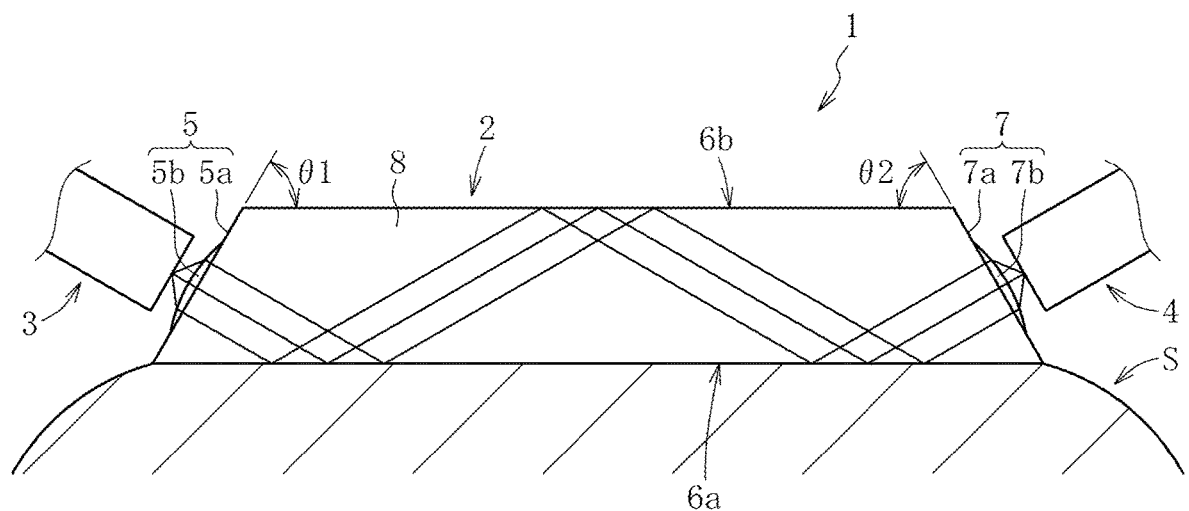
FIG. 1 is a side view of a measurement device comprising an ATR prism according to a first embodiment.
Figure 2:
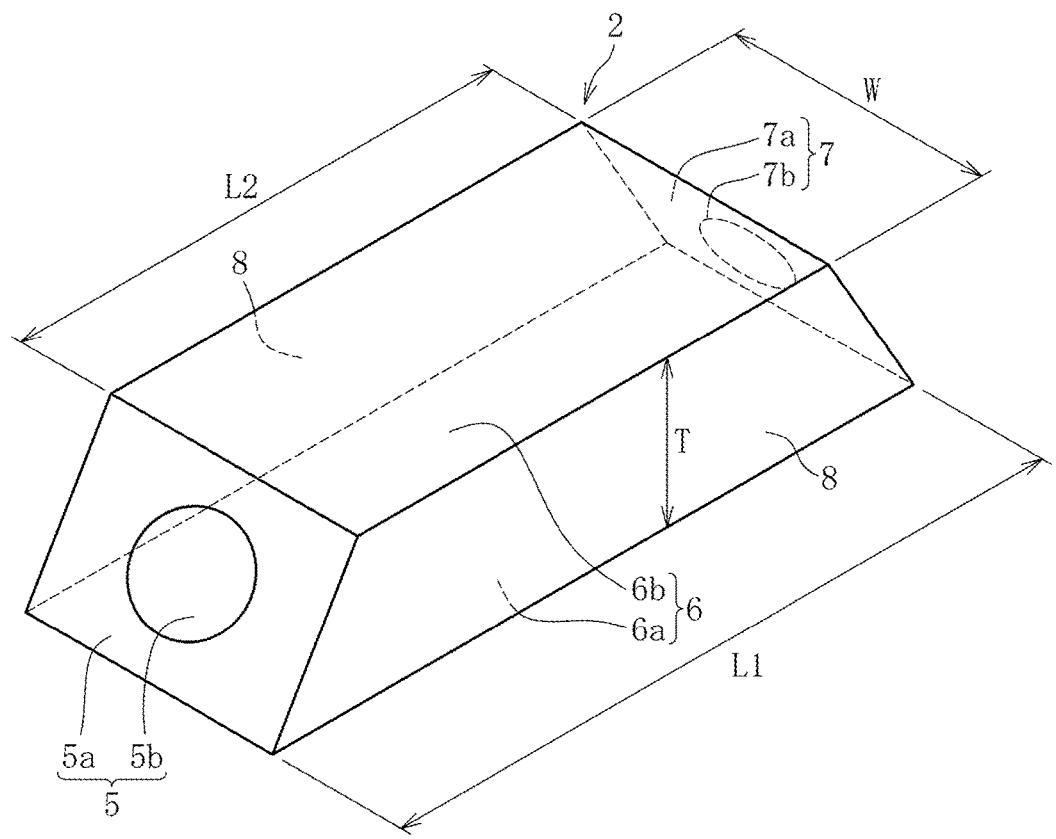
FIG. 2 is a perspective view of the ATR prism.

As illustrated in FIG. 1, a measurement device 1 mainly comprises an ATR prism 2, a light source 3, and a light-receiving part 4. As illustrated in FIG. 1 and FIG. 2, the ATR prism 2 comprises an incident portion 5, a reflecting portion 6, an exit portion 7, and side surfaces 8. Light emitted from the light source 3 is incident on the incident portion 5. The reflecting portion 6 is configured to reflect the incident light. The exit portion 7 is configured to allow the light reflected by the reflecting portion 6 to exit the ATR prism 2. The side surfaces 8 are defined between the incident portion 5 and the exit portion 7.

The incident portion 5 comprises an inclined surface 5a and a lens portion 5b. The inclined surface 5a is inclined with respect to the reflecting portion 6. The lens portion 5b is formed integrally with the inclined surface 5a. An inclination angle $\theta 1$ of the inclined surface 5a is set to, for example, 45 degrees or 60 degrees. However, the inclination angle $\theta 1$ is not limited to the angles described above, and may be suitably set in accordance with a shape and dimensions of the ATR prism 2.

The lens portion 5b is formed in a protruding shape projecting from the inclined surface 5a. However, the shape of the lens portion 5b is not limited to the protruding shape. The lens portion 5b allows the light emitted from the light source 3 to be introduced into the ATR prism 2 after adjusting an incident angle of the light. In this embodiment, the ATR prism 2 comprising the incident portion 5 comprising a single lens portion 5b is described as an example. However, the number of lens portions 5b is not limited to that described in this embodiment. The incident portion 5 may comprise a plurality of lens portions 5b arranged at intervals in a width direction (direction indicated by the reference symbol W in FIG. 2) of the ATR prism 2.

The reflecting portion 6 comprises a first reflecting portion 6a and a second reflecting portion 6b. As illustrated in FIG. 2, a length dimension L1 of the first reflecting portion 6a is larger than a length dimension L2 of the second reflecting portion 6b. The first reflecting portion 6a and the second reflecting portion 6b comprise reflecting surfaces (totally reflecting surfaces) configured to reflect the light introduced from the incident portion 5 into the ATR prism 2, respectively. The reflecting surface of the first reflecting portion 6a is a contact surface to be brought into contact with a biological sample (hereinafter referred to simply as "sample") S being a target to be measured. The reflecting surface of the second reflecting portion 6b is a non-contact surface that is not brought into contact with the sample S.

The exit portion 7 comprises an inclined surface 7a and a lens portion 7b. The inclined surface 7a is inclined with respect to the reflecting portion 6. The lens portion 7b is formed integrally with the inclined surface 7a. An inclination angle $\theta 2$ of the inclined surface 7a is set to, for example, 45 degrees or 60 degrees. However, the inclination angle $\theta 2$ is not limited to the angles described above, and may be suitably set in accordance with a shape and dimensions of the ATR prism 2.

The lens portion 7b is formed in a protruding shape projecting from the inclined surface 7a. However, the shape of the lens portion 7b is not limited to the protruding shape. The lens portion 7b is configured to allow the light reflected by the reflecting portion 6 to exit the ATR prism 2 and travel toward the light-receiving part 4 after adjusting an angle of the light. In this embodiment, the ATR prism 2 comprising the exit portion 7 comprising a single lens portion 7b is described as an example. However, the number of lens portions 7b is not limited to that described in this embodiment. The exit portion 7 may comprise a plurality of lens portions 7b arranged at intervals in the width direction of the ATR prism 2.

The side surfaces 8 separate the incident portion 5 and the exit portion 7 from each other in a longitudinal direction (direction indicated by the reference symbol L1 or L2 in FIG. 2) of the ATR prism 2. The side surfaces 8 also separate the first reflecting portion 6a and the second reflecting portion 6b from each other in a thickness direction (direction indicated by the reference symbol T in FIG. 2) of the ATR prism 2. Each of angles defined by the side surfaces 8 and the reflecting surface of the reflecting portion 6 is set to 90 degrees. However, the angle is not limited to that described in this embodiment.

A width dimension W of the ATR prism 2 is set to fall within a range of, for example, from 2 mm to 15 mm, preferably from 3 mm to 12 mm. A thickness dimension T of the ATR prism 2 is set to fall within a range of, for example, from 1 mm to 10 mm, preferably from 2 mm to 8 mm. The length dimension L1 of the first reflecting portion 6a of the ATR prism 2 is set to fall within a range of, for example, from 5 mm to 30 mm, preferably from 7 mm to 27 mm. The length dimension L2 of the second reflecting portion 6b of the ATR prism 2 is set to fall within a range of, for example, from 3 mm to 20 mm, preferably from 5 mm to 17 mm.

The ATR prism 2 is made of, for example, glass having an internal transmittance of 90% or higher, preferably 91% or higher, more preferably 92% or higher at a wavelength falling within a range of from 8 μm to 10 μm when the glass has a thickness of 2 mm. The glass may comprise, for example, chalcogenide glass. The chalcogenide glass may contain sulfur at a mole percent falling within a range of from 50% to 80%, antimony at a mole percent larger than 0% and equal to or smaller than 40%, germanium at a mole percent larger than 0% and equal to or smaller than 18%, tin at a mole percent falling within a range of from 0% to 20%, and bismuth at a mole percent falling within a range of from 0% to 20%.

The chalcogenide glass contains S more preferably at 55% or larger and 75% or smaller in mole percentage, further preferably at 60% or larger and 70% or smaller. When glass contains S at a mole percent smaller than 50%, vitrification is difficult. Meanwhile, when glass contains S at a mole percent larger than 80%, glass has low weather resistance, thus restricting the circumstances in which the ATR prism can be used.

The chalcogenide glass contains Sb more preferably at 5% or larger and 35% or smaller in mole percentage, further preferably at 10% or larger and 33% or smaller. When glass contains no Sb or contains Sb at a mole percent larger than 40%, vitrification is difficult.

The chalcogenide glass contains Ge more preferably at 2% or larger and 20% or smaller in mole percentage, further preferably at 4% or larger and 15% or smaller. When glass contains no Ge, vitrification is difficult. Meanwhile, when the glass contains Ge at a mole percent larger than 18%, Ge-based crystal is precipitated from the glass, making it difficult to achieve an internal transmittance that contributes to features of the ATR prism.

The chalcogenide glass contains Sn more preferably at 1% or larger and 15% or smaller in mole percentage, further preferably at 5% or larger and 10% or smaller. Tin (Sn) contained in glass is a component that promotes vitrification. When glass contains Sn at a mole percent larger than 20%, however, vitrification is difficult.

The chalcogenide glass contains Bi more preferably at 0.5% or larger and 10% or smaller in mole percentage, further preferably at 2% or larger and 8% or smaller. Bismuth (Bi) contained in glass is a component that reduces energy required for a raw material to vitrify when the glass melts. Meanwhile, when glass contains Bi at a mole percent larger than 20%, Bi-based crystal is precipitated from glass, making it difficult to achieve an internal transmittance that contributes to the features of the ATR prism.

The chalcogenide glass is not limited to the composition described above, and may contain tellurium at a mole percent falling within a range of from 4% to 80%, germanium at a mole percent larger than 0% and equal to or smaller than 50%, and gallium at a mole percent falling within a range of from 0% to 20%.

The chalcogenide glass contains Te more preferably at 10% or larger and 75% or smaller in mole percentage, further preferably at 20% or larger and 70% or smaller. When glass contains Te at a mole percent smaller than 4%, vitrification is difficult. Meanwhile, when the glass contains Te at a mole percent larger than 80%, Te-based crystal is precipitated from the glass, making it difficult to achieve an internal transmittance that contributes to features of the ATR prism.

The chalcogenide glass contains Ge more preferably at 1% or larger and 40% or smaller in mole percentage, further preferably at 5% or larger and 30% or smaller. When glass contains no Ge, vitrification is difficult. Meanwhile, when the glass contains Ge at a mole percent larger than 50%, Ge-based crystal is precipitated from the glass, making it difficult to achieve an internal transmittance that contributes to features of the ATR prism.

The chalcogenide glass contains Ga more preferably at 0.1% or larger and 15% or smaller in mole percentage, further preferably at 1% or larger and 10% or smaller. Glass containing Ga has a wider vitrification range, resulting in enhanced thermal stability of glass (stability in vitrification).

It is preferred that the glass have an internal transmittance of 10% or higher, more preferably 30% or higher, further preferably 50% or higher at a wavelength falling within a range of from 1 μm to 2 μm when the glass has a thickness of 2 mm so that processing quality, internal quality, or the like of the ATR prism can be checked with use of an optical device using near-infrared light. As a result, the ATR prism having high quality can be obtained.

As illustrated in FIG. 1, the light source 3 is arranged in the vicinity of the incident portion 5 of the ATR prism 2 so as to be opposed to the lens portion 5b of the incident portion 5. The light source 3 is configured to radiate, for example, infrared light to the incident portion 5 of the ATR prism 2. The light source 3 comprises, for example, an apparatus comprising a quantum-cascade laser configured to emit laser light in an infrared range. However, the light source 3 is not limited to that described in this embodiment. The term "infrared light" here refers to light having a wavelength falling within a range of from 8 μm to 10 μm.

As illustrated in FIG. 1, the light-receiving part 4 is arranged in the vicinity of the exit portion 7 so as to be opposed to the lens portion 7b of the exit portion 7.

Now, a method of measuring biological information with the measurement device 1 is described. Light (infrared light) emitted from the light source 3 is adjusted by the lens portion 5b of the incident portion 5, and is then introduced into the ATR prism 2. The light propagates to the lens portion 7b of the exit portion 7 while being repeatedly reflected (totally reflected) by the first reflecting portion 6a and the second reflecting portion 6b.

When the sample S is in contact with the first reflecting portion 6a, the light is totally reflected by the contact surface of the first reflecting portion 6a of the ATR prism 2, which is in contact with the sample S, instead of exiting the ATR prism 2. In this case, the light penetrates into the sample S by a small distance (evanescent wave). When the penetrating light is absorbed by the sample S, the reflected light is attenuated in accordance with a concentration of a light absorbing substance. Accordingly, an absorption spectrum of a material to be measured, which is contained in the sample S, can be obtained. An infrared absorption spectrum measured based on the light that has exited the exit portion 7 and has reached the light-receiving part 4 and conditions inside the sample S have a correlation. Accordingly, biological information of the sample S, such as a blood-sugar level, can be obtained based on the infrared absorption spectrum.

Now, a method of manufacturing the ATR prism 2 having the above-mentioned configuration is described. This method comprises a preparation step of preparing base-material glass and a molding step of molding the base-material glass into the ATR prism 2.

Figure 3:
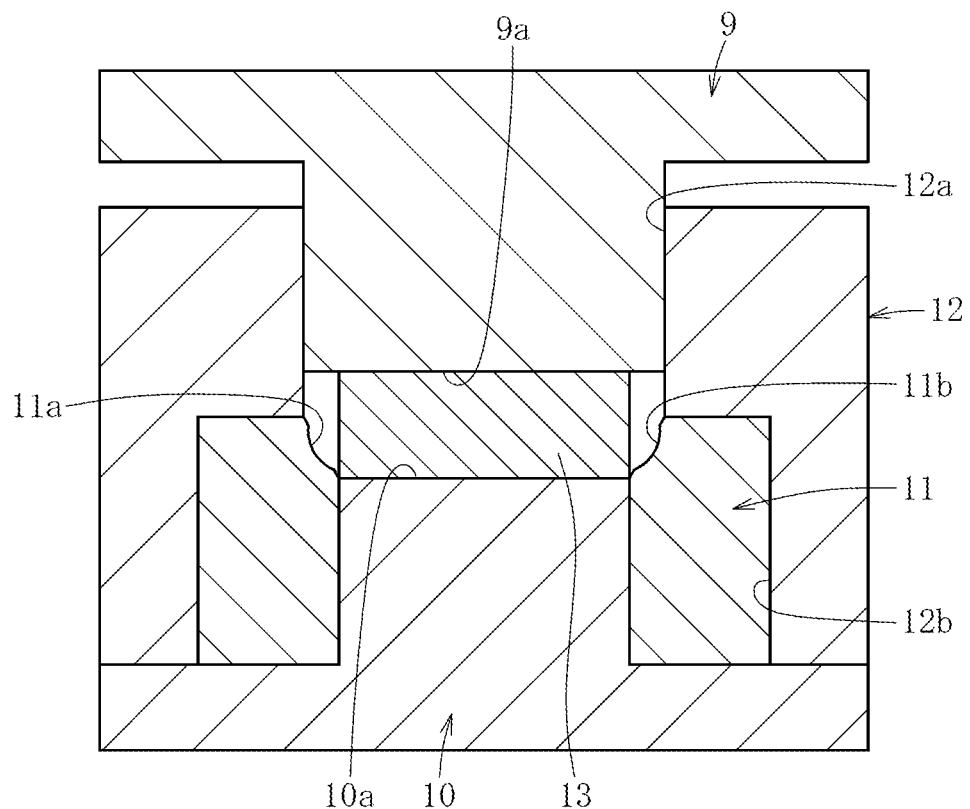
FIG. 3 is a sectional view for illustrating one step of a method of manufacturing an ATR prism.

In the preparation step, for example, base-material glass comprising chalcogenide glass containing S at 60%, Sb at 30%, Ge at 5%, and Sn at 5% in mole percentage as a glass composition or chalcogenide glass containing Te at 70%, Ge at 25%, and Ga at 5% in mole percentage as a glass composition is prepared. As illustrated in FIG. 3, a base-material glass 13 has a rectangular parallelepiped shape. However, the shape of the base-material glass 13 is not limited to a rectangular parallelepiped shape. In the preparation step, the entire surfaces or a part of the surfaces of the base-material glass 13 may be subjected to polishing (mirror finishing).

Figure 4:
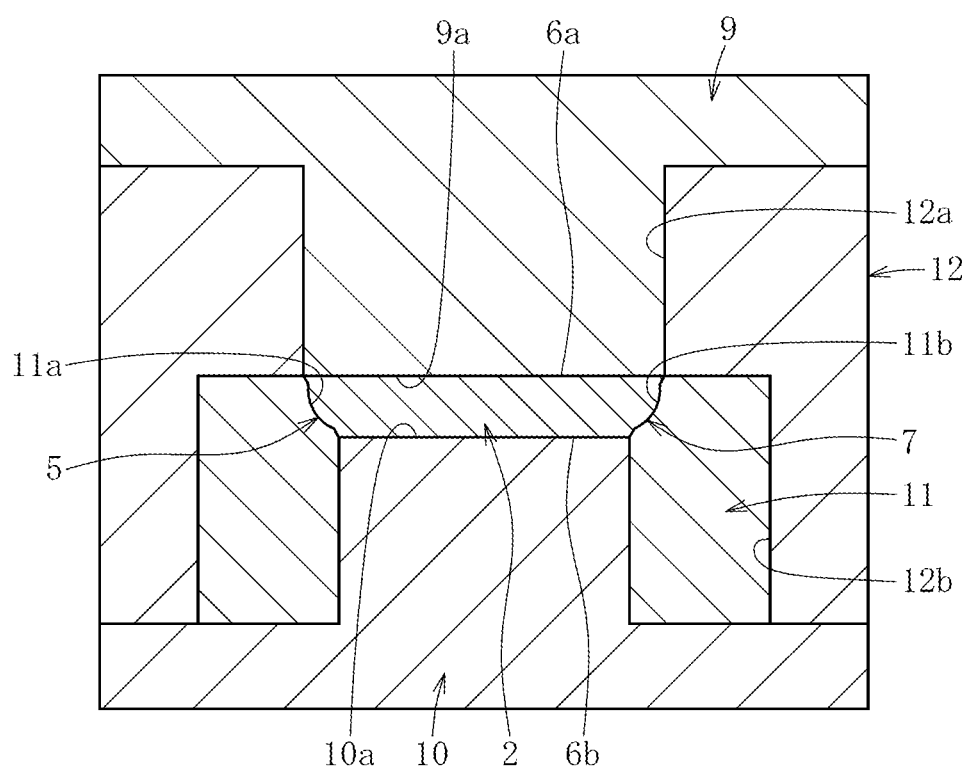
FIG. 4 is a sectional view for illustrating the one step of the method of manufacturing an ATR prism.

In the molding step, the base-material glass 13 is pressed between molding dies while being heated to thereby form the ATR prism 2 by molding. As illustrated in FIG. 3 and FIG. 4, molding dies 9 to 12 used in the molding step comprise a first molding die 9, a second molding die 10, a third molding die 11, and a fourth molding die 12. The molding dies 9 to 12 are made of, for example, a metal such as cemented carbide.

It is preferred that the molding dies 9 to 12 be placed in a chamber made of a metal, which is supplied with an inert gas (for example, a nitrogen gas). A heater configured to heat the molding dies 9 to 12 and the base-material glass 13 is provided outside the chamber.

The first molding die 9 is provided above the second molding die 10. The first molding die 9 comprises a molding surface 9a configured to form the first reflecting portion 6a of the ATR prism 2. The second molding die 10 comprises a molding surface 10a configured to form the second reflecting portion 6b of the ATR prism 2.

The third molding die 11 has a hollow shape so as to allow a part of the second molding die 10 to be inserted thereinto. The third molding die 11 has a molding surface 11a and a molding surface 11b. The molding surface 11a is configured to form the inclined surface 5a and the lens portion 5b of the incident portion 5 of the ATR prism 2. The molding surface 11b is configured to form the inclined surface 7a and the lens portion 7b of the exit portion 7. In addition, the third molding die 11 comprises molding surfaces (not shown) configured to form the side surfaces 8 of the ATR prism 2.

The fourth molding die 12 has a hollow shape, and comprises a first hollow portion 12a and a second hollow portion 12b. A part of the first molding die 9 is inserted into the first hollow portion 12a. The third molding die 11 is inserted into the second hollow portion 12b. The first hollow portion 12a of the fourth molding die 12 functions as a guide portion configured to allow vertical movement of the first molding die 9 under a state in which a part of the first molding die 9 is inserted into the first hollow portion 12a.

In the molding step, the base-material glass 13 is placed on the molding surface 10a of the second molding die 10. Next, the first molding die 9 inserted into the first hollow portion 12a of the fourth molding die 12 is lowered and brought closer to the second molding die 10. Subsequently, the base-material glass 13 is pressed between the first molding die 9 and the second molding die 10 while the molding dies 9 to 12 and the base-material glass 13 are being heated by the heater.

In the molding step, the base-material glass 13 is heated to a temperature falling within a range of, for example, from 160° C. to 260° C. The heated base-material glass 13 softens, and is deformed under pressure applied from the first molding die 9. The molding surfaces 9a, 10a, 11a, and 11b and the molding surfaces (not shown) of the first molding die 9 to the third molding die 11 are brought into contact with the softened base-material glass 13 to thereby form the incident portion 5, the reflecting portion 6, the exit portion 7, and the side surfaces 8 of the ATR prism 2. After that, temperature of the first molding die 9 and the second molding die 10 is lowered so as to anneal and cool the molded glass. As a result, the ATR prism 2 is completed.

The above-mentioned ATR prism 2 and method of manufacturing the ATR prism 2 according to the present invention enable easy manufacturing of the ATR prism 2 by molding the base-material glass 13 without using polishing or an etching treatment, which has been required in the related-art methods. As a result, a yield of the ATR prism 2 is improved. In addition, shape accuracy of the lens portion 5b serving as an incident surface of the incident portion 5, the totally reflecting surfaces of the reflecting portion 6, and the lens portion 7b serving as an exit surface of the exit portion 7 of the ATR prism 2 is enhanced to thereby improve light detection accuracy. The present invention does not eliminate the possibility of polishing or an etching treatment, which may be performed after molding so as to adjust the shape accuracy of the ATR prism 2 as final shape accuracy.

Figure 5:
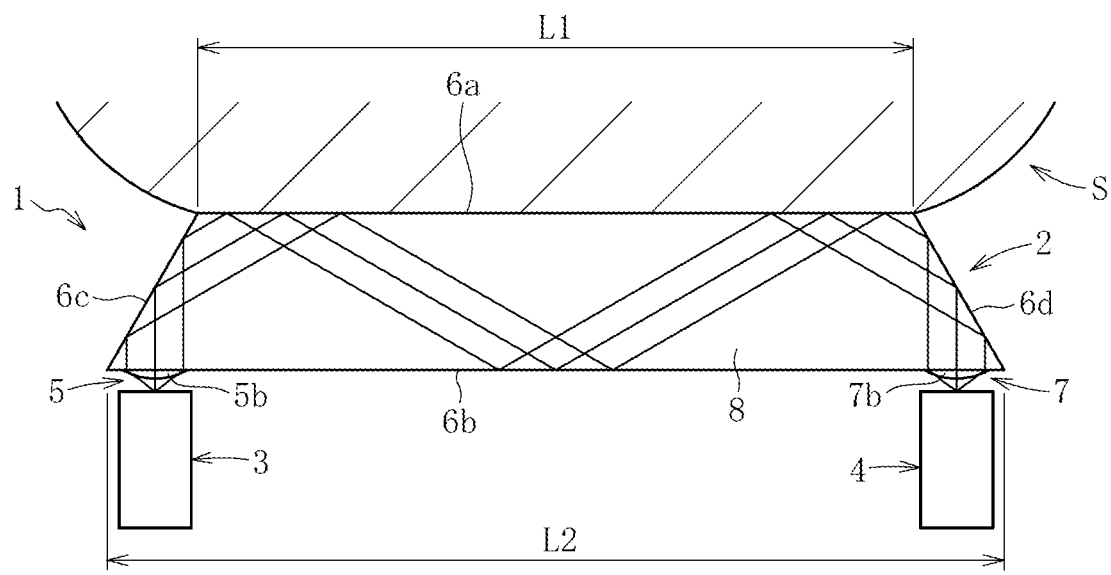
FIG. 5 is a side view of a measurement device comprising an ATR prism according to a second embodiment.
Figure 6:
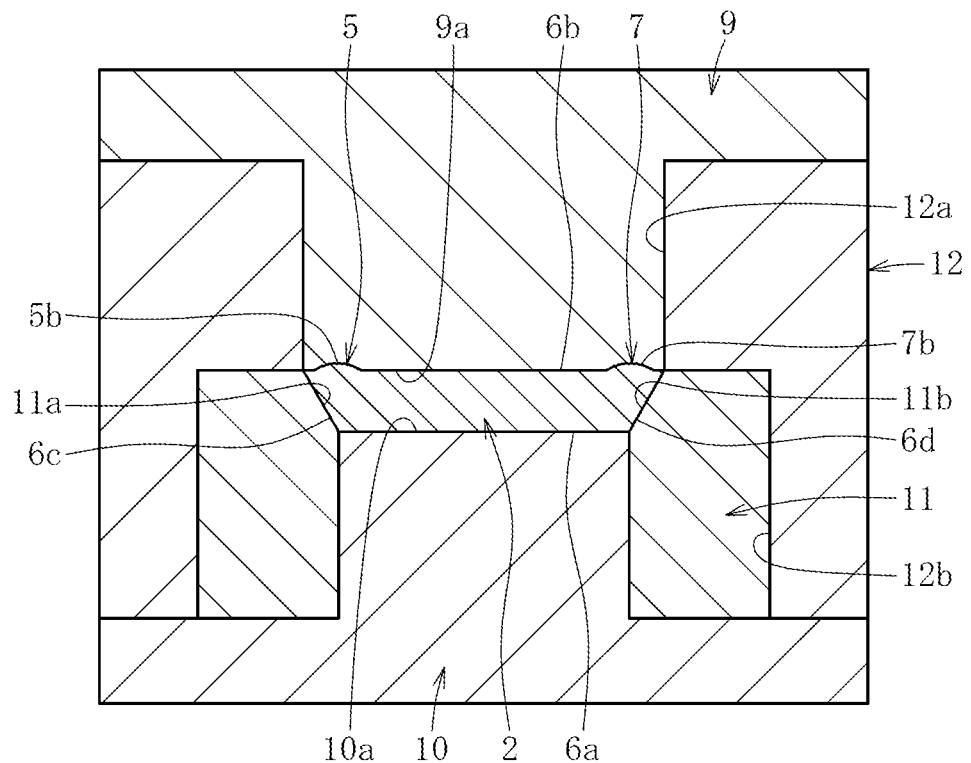
FIG. 6 is a sectional view of molding dies used in the method of manufacturing an ATR prism.

FIG. 5 and FIG. 6 are views for illustrating a second embodiment of the present invention. An ATR prism 2 comprises a first reflecting portion 6a and a second reflecting portion 6b. The first reflecting portion 6a is to be brought into contact with a sample S. The second reflecting portion 6b is opposed to the first reflecting portion 6a, and is not brought into contact with the sample S. A length dimension L1 of the first reflecting portion 6a of the ATR prism 2 according to the second embodiment is smaller than a length dimension L2 of the second reflecting portion 6b.

An incident portion 5 and an exit portion 7 are formed integrally with a reflecting surface of the second reflecting portion 6b. As illustrated in FIG. 5, unlike the ATR prism 2 according to the first embodiment, the incident portion 5 does not comprise an inclined surface 5a. The incident portion 5 comprises only a lens portion 5b. The lens portion 5b is formed integrally with the reflecting surface of the second reflecting portion 6b at its one end of the reflecting surface in a longitudinal direction. Unlike the ATR prism 2 according to the first embodiment, the exit portion 7 does not comprise an inclined surface 7a. The exit portion 7 comprises only a lens portion 7b. The lens portion 7b is formed integrally with the reflecting surface of the second reflecting portion 6b at its another end of the reflecting surface in the longitudinal direction.

The ATR prism 2 comprises, in addition to the first reflecting portion 6a and the second reflecting portion 6b, a third reflecting portion 6c and a fourth reflecting portion 6d. The third reflecting portion 6c and the fourth reflecting portion 6d connect the first reflecting portion 6a and the second reflecting portion 6b to each other.

The third reflecting portion 6c comprises a reflecting surface that is inclined with respect to the first reflecting portion 6a and the second reflecting portion 6b. An inclination angle of the reflecting surface is set to 45 degrees or 60 degrees, but is not limited to these angles. The reflecting surface (inclined surface) reflects light, which has been introduced from the incident portion 5 into the ATR prism 2, toward the first reflecting portion 6a.

The fourth reflecting portion 6d comprises a reflecting surface (inclined surface) that is inclined with respect to the first reflecting portion 6a and the second reflecting portion 6b. An inclination angle of the reflecting surface is set to 45 degrees or 60 degrees, but is not limited to these angles. The reflecting surface (inclined surface) reflects the light, which has been repeatedly reflected (totally reflected) by the first reflecting portion 6a and the second reflecting portion 6b, toward the lens portion 7b of the exit portion 7.

As illustrated in FIG. 6, a method of manufacturing the ATR prism 2 according to the second embodiment comprises a molding step, in which the reflecting surface of the second reflecting portion 6b, the lens portion 5b of the incident portion 5, and the lens portion 7b of the exit portion 7 of the ATR prism 2 are formed by a molding surface 9a of a first molding die 9. Further, the first reflecting portion 6a of the ATR prism 2 is formed by a molding surface 10a of a second molding die 10. Still further, the third reflecting portion 6c and the fourth reflecting portion 6d of the ATR prism 2 are formed by molding surfaces 11a and 11b of a third molding die 11. Still further, side surfaces 8 of the ATR prism 2 are formed by molding surfaces (not shown) of the third molding die 11, as in the first embodiment.

Other configurations of the ATR prism 2 and the method of manufacturing the ATR prism 2 in the second embodiment are the same as those of the ATR prism 2 and the method of manufacturing the ATR prism 2 in the first embodiment. In the second embodiment, the same components as those in the first embodiment are denoted by the same reference symbols.

FIG. 7 to FIG. 10 are views for illustrating a third embodiment of the present invention. An ATR prism 2 according to the third embodiment is different from the ATR prism 2 according to the second embodiment in configurations of an incident portion 5 and an exit portion 7. A lens portion 5b of the incident portion 5 is formed on a first recessed portion 14 formed in a reflecting surface of a second reflecting portion 6b at one end of the reflecting surface in a longitudinal direction so as to prevent the lens portion 5b from projecting beyond the reflecting surface of the second reflecting portion 6b. The exit portion 7 is formed on a second recessed portion 15 formed in the reflecting surface of the second reflecting portion 6b at another end of the reflecting surface in the longitudinal direction so as to prevent the exit portion 7 from projecting beyond the reflecting surface of the second reflecting portion 6b.

Figure 7:
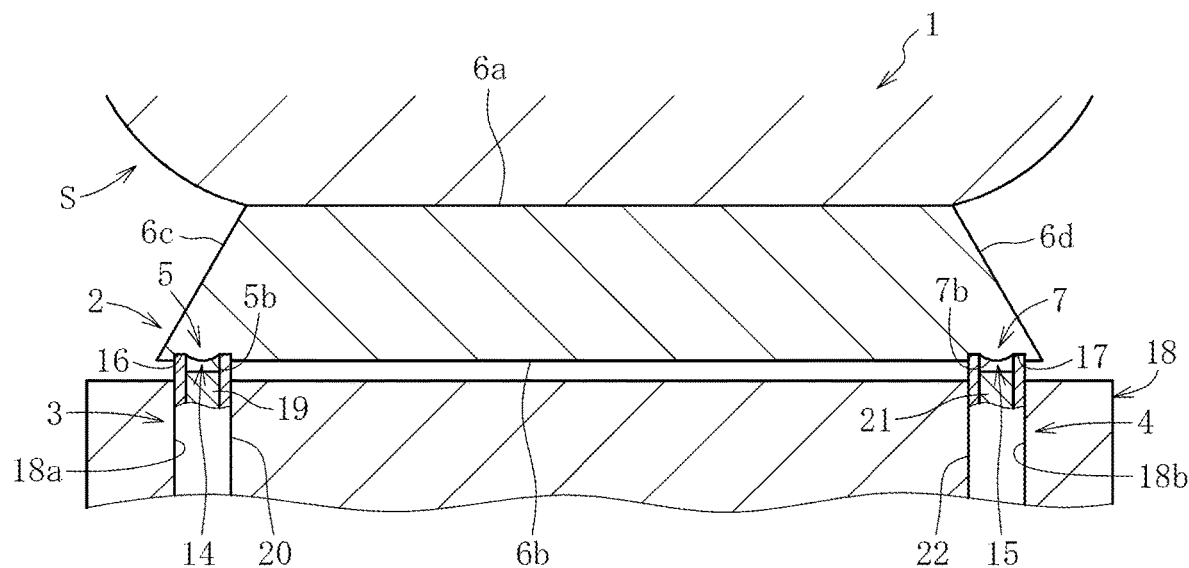
FIG. 7 is a side view of a measurement device comprising an ATR prism according to a third embodiment.
Figure 8:
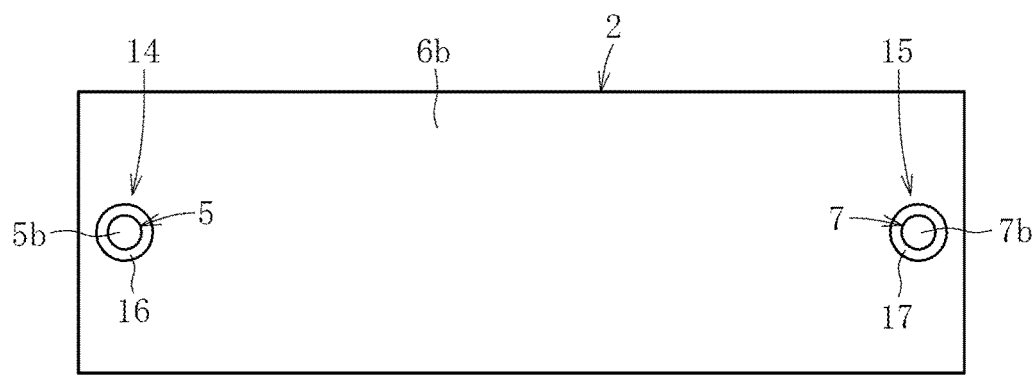
FIG. 8 is a bottom view of the ATR prism.

As illustrated in FIG. 7, the lens portions 5b and 7b, each having a protruding shape, are formed at center positions of the recessed portions 14 and 15, respectively. As illustrated in FIG. 8, the recessed portions 14 and 15 comprise annular groove portions (first groove portion 16 and second groove portion 17) around the lens portions 5b and 7b, respectively.

Figure 9:
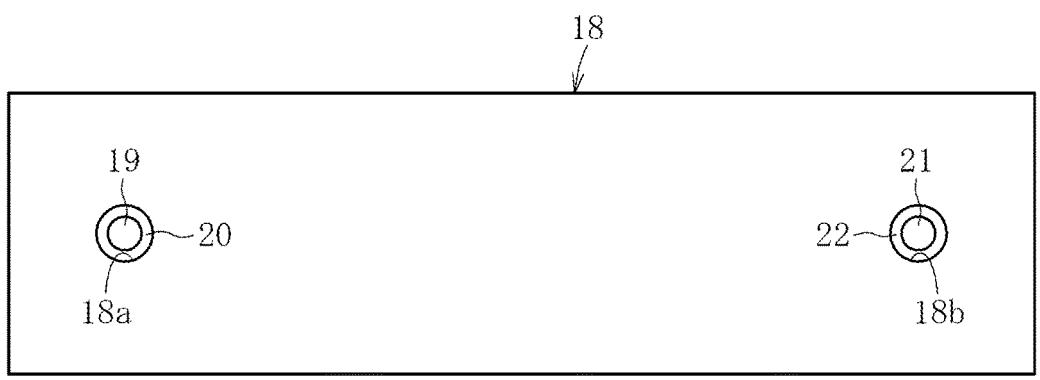
FIG. 9 is a plan view for illustrating a component of the measurement device.

As illustrated in FIG. 7 and FIG. 9, a measurement device 1 according to the third embodiment comprises a holding member 18 configured to hold a light source 3 and a light-receiving part 4. The holding member 18 comprises a first hole 18a and a second hole 18b. The first hole 18a is configured to hold the light source 3, and the second hole 18b is configured to hold the light-receiving part 4.

The light source 3 is formed of an optical fiber, and comprises a core 19 for light irradiation and a covering member (protecting member) 20. The covering member 20 is configured to cover the core 19. The covering member 20 has, for example, a cylindrical shape so as to cover an entire periphery of the core 19. An end portion of the covering member 20 projects beyond an end portion of the core 19.

The light-receiving part 4 is formed of an optical fiber, and comprises a core 21 for light reception and a covering member (protecting member) 22. The covering member 22 is configured to cover the core 21. The covering member 22 has, for example, a cylindrical shape so as to cover an entire periphery of the core 21. An end portion of the covering member 22 projects beyond an end portion of the core 21.

Now, a method of mounting the light source 3 and the light-receiving part 4 to the ATR prism 2 is described.

Figure 10:
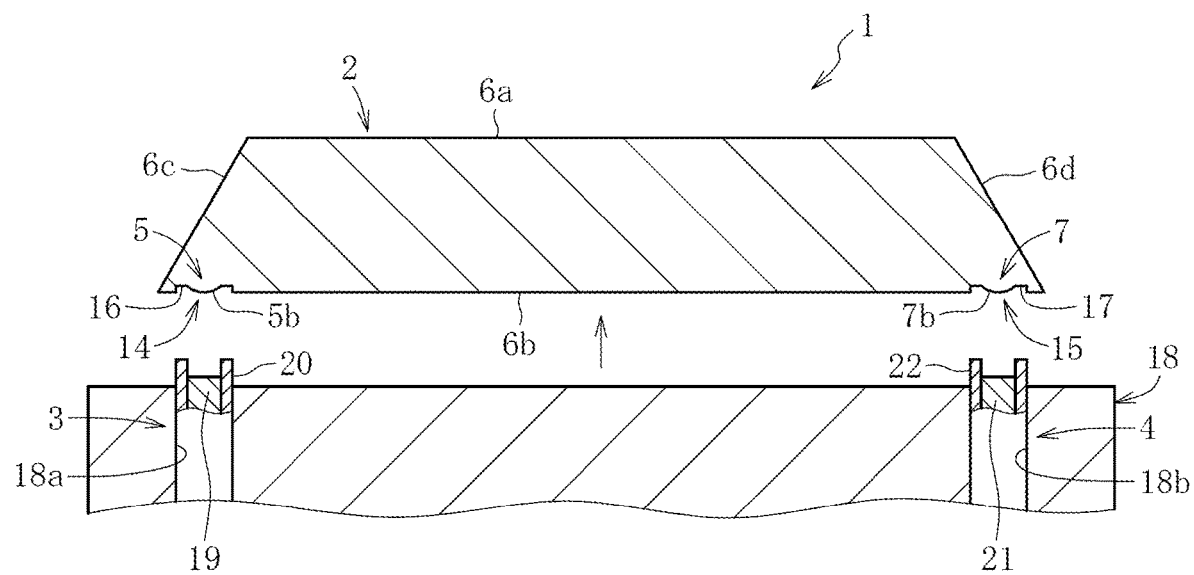
FIG. 10 is a side view for illustrating a method of mounting the component of the measurement device to the ATR prism.

As illustrated in FIG. 10, the holding member 18, which is located apart from the ATR prism 2, is brought closer to the ATR prism 2 so that an end portion of the light source 3 (end portion of the covering member 20) is fitted into the first groove portion 16 of the first recessed portion 14 of the ATR prism 2. Further, an end portion of the light-receiving part 4 (end portion of the covering member 22) is fitted into the second groove portion 17 of the second recessed portion 15 of the ATR prism 2 (see FIG. 7).

As described above, the first groove portion 16 of the first recessed portion 14 on which the incident portion 5 is formed functions as a positioning portion configured to position the light source 3 with respect to the incident portion 5. Further, the second groove portion 17 of the second recessed portion 15 on which the exit portion 7 is formed functions as a positioning portion configured to position the light-receiving part 4 with respect to the exit portion 7. The measurement device 1 according to the third embodiment comprises the groove portions 16 and 17, which enable easy positioning (alignment) of the light source 3 and the light-receiving part 4 with respect to the ATR prism 2 simply by bringing the holding member 18 closer to the ATR prism 2.

Other configurations of the ATR prism 2 and the method of manufacturing the ATR prism 2 in the third embodiment are the same as those of the ATR prism 2 and the method of manufacturing the ATR prism 2 in the second embodiment. In the third embodiment, the same components as those in the second embodiment are denoted by the same reference symbols.

Figure 11:
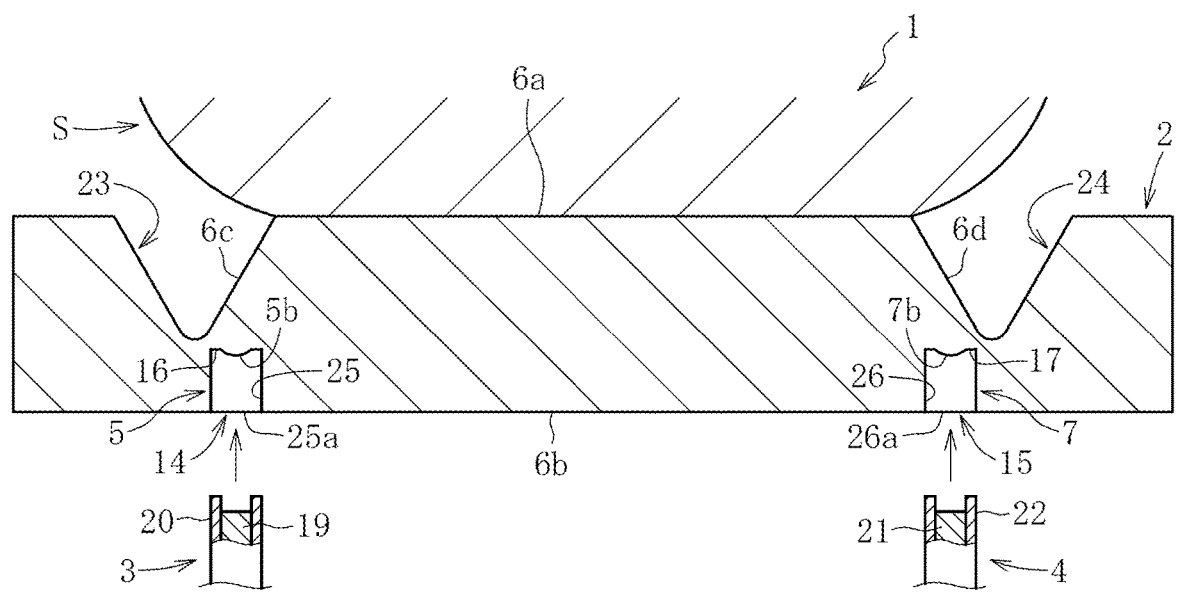
FIG. 11 is a side view of a measurement device comprising an ATR prism according to a fourth embodiment.

FIG. 11 is a view for illustrating a fourth embodiment of the present invention. The fourth embodiment is different from the third embodiment in the shape of the ATR prism.

An ATR prism 2 according to the fourth embodiment comprises recessed portions 23 and 24. The recessed portion 23 comprises a third reflecting portion 6c, and the recessed portion 24 comprises a fourth reflecting portion 6d. The third reflecting portion 6c is formed on a side surface (inclined surface) of the recessed portion 23. The fourth reflecting portion 6d is formed on a side surface (inclined surface) of the recessed portion 24.

A first recessed portion 14 on which an incident portion 5 is formed comprises a first groove portion 16 having an annular shape and a first side wall portion 25. A part of the light source 3 is inserted into the first side wall portion 25. The first side wall portion 25 comprises an insertion port 25a for insertion of the light source 3. The first side wall portion 25 is a guide hole configured to guide the light source 3 from the insertion port 25a to the first groove portion 16. The first side wall portion 25 also functions as a holding portion configured to hold an outer peripheral surface of a covering member 20 for the light source 3, which is inserted thereinto.

A second recessed portion 15 comprises a second groove portion 17 having an annular shape and a second side wall portion 26. A part of a light-receiving part 4 is inserted into the second side wall portion 26. The second side wall portion 26 comprises an insertion port 26a for insertion of the light-receiving part 4. The second side wall portion 26 is a guide hole configured to guide the light-receiving part 4 from the insertion port 26a to the second groove portion 17. The second side wall portion 26 also functions as a holding portion configured to hold an outer peripheral surface of a covering member 22 for the light-receiving part 4, which is inserted thereinto.

According to the fourth embodiment, the ATR prism 2 comprises the recessed portion 14 having the groove portion 16 and the side wall portion 25 and the recessed portion 15 having the groove portion 17 and the side wall portion 26, which enable easy positioning and holding of the light source 3 and the light-receiving part 4.

Other configurations of the ATR prism 2 and the method of manufacturing the ATR prism 2 in the fourth embodiment are the same as those of the ATR prism 2 and the method of manufacturing the ATR prism 2 in the third embodiment. In the fourth embodiment, the same components as those in the third embodiment are denoted by the same reference symbols.

The present invention is not limited to the configurations of the above-mentioned embodiments. In addition, the action and effect of the present invention are not limited to those described above. The present invention may be modified in various forms within the range not departing from the spirit of the present invention.

In the embodiments described above, the ATR prism 2 comprising the incident portion 5 comprising the lens portion 5b and the exit portion 7 comprising the lens portion 7b has been described as an example. However, the configuration of the ATR prism 2 according to the present invention is not limited to that described above. Only one of the incident portion 5 and the exit portion 7 may comprise a lens portion. Further, the incident portion 5 and the exit portion 7 are not required to comprise a lens portion.

In the second to fourth embodiments described above, the ATR prism 2 comprising the incident portion 5 and the exit portion 7, which are integrally formed with the second reflecting portion 6b, has been described as an example. However, the incident portion 5 and the exit portion 7 of the ATR prism 2 according to the present invention are not limited to those described above. The incident portion 5 or the exit portion 7 may be formed on another reflecting portion.

In the fourth embodiment described above, the ATR prism 2 comprising the recessed portion 14 having the side wall portion 25 and the recessed portion 15 having the side wall portion 26, which allow the light source 3 and the light-receiving part 4 to be directly mounted thereto, has been described as an example. However, the configuration of the ATR prism 2 according to the present invention is not limited to that described above. For example, adaptors may be mounted to the side wall portion 25 of the recessed portion 14 and the side wall portion 26 of the recessed portion 15, respectively. The light source 3 and the light-receiving part 4 are removably mounted to the adapters. This configuration allows the light source 3 and the light-receiving part 4 to be removably mounted to the ATR prism 2 (adapters).

What is claimed is:

1. An attenuated total reflection (ATR) prism comprising:
    glass having an internal transmittance of 90% or higher at a wavelength falling within a wavelength range of from 8 μm to 10 μm when the glass has a thickness of 2 mm;
    an incident portion on which light having a wavelength falling within the wavelength range is incident;
    a reflecting portion configured to reflect the light;
    an exit portion configured to allow the light to exit; and
    a lens portion formed integrally with the incident portion,
    wherein the incident portion is formed integrally with the reflecting portion,
    wherein the reflecting portion comprises a reflecting surface configured to reflect the light,
    wherein the lens portion is formed on the reflecting surface, and
    wherein the lens portion is formed on a recessed portion formed in the reflecting surface so as to prevent the lens portion from projecting beyond the reflecting surface.

2. The ATR prism according to claim 1,
    wherein the recessed portion comprises a positioning portion configured to allow positioning of a light source configured to radiate the light to the incident portion.

3. A method of manufacturing the ATR prism of claim 1, the method comprising a molding step of forming the ATR prism by pressing base-material glass with molding dies while heating the base-material glass.

4. The ATR prism according to claim 1, wherein the glass comprises chalcogenide glass.

5. The ATR prism according to claim 4, wherein the chalcogenide glass contains sulfur at a mole percent falling within a range of from 50% to 80%, antimony at a mole percent larger than 0% and equal to or smaller than 40%, germanium at a mole percent larger than 0% and equal to or smaller than 18%, tin at a mole percent falling within a range of from 0% to 20%, and bismuth at a mole percent falling within a range of from 0% to 20%.

6. The ATR prism according to claim 4, wherein the chalcogenide glass contains tellurium at a mole percent falling within a range of from 4% to 80%, germanium at a mole percent larger than 0% and equal to or smaller than 50%, and gallium at a mole percent falling within a range of from 0% to 20%.

7. The ATR prism according to claim 1, wherein the lens portion of the incident portion comprises a plurality of lens portions.

8. An attenuated total reflection (ATR) prism comprising:
    glass having an internal transmittance of 90% or higher at a wavelength falling within a wavelength range of from 8 μm to 10 μm when the glass has a thickness of 2 mm;
    an incident portion on which light having a wavelength falling within the wavelength range is incident;
    a reflecting portion configured to reflect the light;
    an exit portion configured to allow the light to exit; and
    a lens portion formed integrally with the exit portion,
    wherein the exit portion is formed integrally with the reflecting portion,
    wherein the reflecting portion comprises a reflecting surface configured to reflect the light,
    wherein the lens portion is formed on the reflecting surface, and
    wherein the lens portion is formed on a recessed portion formed in the reflecting surface so as to prevent the lens portion from projecting beyond the reflecting surface.

9. The ATR prism according to claim 8
    wherein the recessed portion comprises a positioning portion configured to allow positioning of a light-receiving part configured to receive the light from the exit portion.

10. The ATR prism according to claim 8, wherein the lens portion of the exit portion comprises a plurality of lens portions.

11. An attenuated total reflection (ATR) prism comprising:

glass having an internal transmittance of 90% or higher at a wavelength falling within a wavelength range of from 8 μm to 10 μm when the glass has a thickness of 2 mm;
an incident portion on which light having a wavelength falling within the wavelength range is incident;
a reflecting portion configured to reflect the light;
an exit portion configured to allow the light to exit;
a first lens portion formed integrally with the incident portion; and
a second lens portion formed integrally with the exit portion,
wherein the incident portion and the exit portion are formed integrally with the reflecting portion,
wherein the reflecting portion comprises a reflecting surface configured to reflect the light,
wherein the first lens portion of the incident portion and the second lens portion of the exit portion are formed on the reflecting surface,
wherein the first lens portion of the incident portion is formed on a first recessed portion formed in the reflecting surface so as to prevent the first lens portion from projecting beyond the reflecting surface, and
the second lens portion of the exit portion is formed on a second recessed portion formed in the reflecting surface so as to prevent the second lens portion from projecting beyond the reflecting surface.

12. The ATR prism according to claim 11, wherein
the first recessed portion comprises a positioning portion configured to allow positioning of a light source configured to radiate the light to the incident portion, and
the second recessed portion comprises a positioning portion configured to allow positioning of a light-receiving part configured to receive the light from the exit portion.

* * * * *